United States Patent
Kopf et al.

(10) Patent No.: US 9,569,812 B1
(45) Date of Patent: Feb. 14, 2017

(54) VIEW RENDERING FROM MULTIPLE SERVER-SIDE RENDERINGS

(71) Applicant: Microsoft Technology Licensing, LLC, Redmond, WA (US)

(72) Inventors: Johannes Kopf, Hamburg (DE); Eduardo Alberto Cuervo Laffaye, Bellevue, WA (US); David Chiyuan Chu, Kirkland, WA (US); Bernhard Reinert, Saarbruecken (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/990,623

(22) Filed: Jan. 7, 2016

(51) Int. Cl.
| | |
|---|---|
| *G06T 17/00* | (2006.01) |
| *G06T 19/00* | (2011.01) |
| *G06T 1/20* | (2006.01) |
| *G09G 5/36* | (2006.01) |
| *G06T 15/20* | (2011.01) |
| *G06T 5/00* | (2006.01) |
| *H04L 29/06* | (2006.01) |

(52) U.S. Cl.
CPC ............. *G06T 1/20* (2013.01); *G06T 5/002* (2013.01); *G06T 15/20* (2013.01); *G06T 17/00* (2013.01); *G09G 5/363* (2013.01); *H04L 67/42* (2013.01); *G09G 2360/06* (2013.01); *G09G 2370/022* (2013.01)

(58) Field of Classification Search
CPC .... G06F 3/04815; G06T 17/205; G06T 15/00; G06T 11/60; G06T 3/4038; G06T 2207/20212; G06T 2207/20221; G06T 7/0046; G06T 2210/44
See application file for complete search history.

(56) References Cited

U.S. PATENT DOCUMENTS

| | | |
|---|---|---|
| 6,359,603 B1 | 3/2002 | Zwern |
| 6,415,317 B1 | 7/2002 | Yelon et al. |
| 7,068,274 B2 | 6/2006 | Welch et al. |
| 7,224,382 B2 | 5/2007 | Baker |

(Continued)

OTHER PUBLICATIONS

Smit, et al., "A Shared-Scene-Graph Image-Warping Architecture for VR: Low Latency Versus Image Quality", In Proceedings of Computer & Graphics, vol. 34, Issue 1, Feb. 2010, pp. 3-16.

(Continued)

*Primary Examiner* — Phi Hoang
(74) *Attorney, Agent, or Firm* — Alin Corie; Sandy Swain; Micky Minhas

(57) ABSTRACT

A first user input is received when a client program executed by a client computing device is in a first state. The first user input is sent to a server computing device to render a view of a virtual scene. A state change from the first state in the client program due to a second user input or a program event is identified. One or more gaps in a server-rendered current view due to the state change are determined. A rendering of the one or more gaps is selected from among the server-rendered current view, a server-rendered predicted view and one or more prior-rendered views. A current view is rendered using a simplified model of the virtual scene by rendering the one or more gaps from the selected rendering. The current rendered view is visually presented via a display of the client computing device.

14 Claims, 7 Drawing Sheets

(56) References Cited

U.S. PATENT DOCUMENTS

| | | | |
|---|---|---|---|
| 7,627,632 B2 | 12/2009 | Douceur et al. | |
| 8,009,022 B2 | 8/2011 | Kipman et al. | |
| 8,203,568 B2 | 6/2012 | Clemie et al. | |
| 8,386,560 B2 | 2/2013 | Ma et al. | |
| 8,403,757 B2 | 3/2013 | Mizrachi | |
| 8,643,701 B2 | 2/2014 | Nguyen et al. | |
| 8,774,267 B2 | 7/2014 | Gaddy et al. | |
| 9,396,588 B1* | 7/2016 | Li | G06F 3/011 |
| 2002/0158873 A1 | 10/2002 | Williamson | |
| 2012/0268499 A1* | 10/2012 | Izumi | G06T 3/20 345/682 |
| 2013/0151651 A1* | 6/2013 | Chhaochharia | A63F 13/358 709/214 |
| 2014/0064607 A1 | 3/2014 | Grossmann et al. | |
| 2014/0125650 A1* | 5/2014 | Neill | H04N 13/0011 345/419 |
| 2014/0176591 A1 | 6/2014 | Klein et al. | |
| 2014/0375634 A1* | 12/2014 | Hillesland | G06T 15/20 345/420 |
| 2015/0029179 A1* | 1/2015 | Han | G06F 3/04815 345/419 |
| 2015/0222730 A1* | 8/2015 | Gower | H04L 67/42 709/203 |
| 2015/0269785 A1* | 9/2015 | Bell | G06T 19/003 345/427 |

OTHER PUBLICATIONS

Pasman, et al., "Low Latency Rendering for Mobile Augmented Reality", In Proceedings of ASCI Research School Conference, Jun. 1999, 7 pages.

Chaudhuri, et al., "Distributed Rendering of Virtual Worlds", In Technical Report CSTR, Feb. 2008, 9 pages.

Kniss, et al., "Interactive Texture-Based Volume Rendering for Large Data Sets", In Proceedings of IEEE Computer Graphics and Applications, vol. 21, Issue 4, Jul. 2001, pp. 52-61.

Zielinski, et al., "Exploring the Effects of Image Persistence in Low Frame Rate Virtual Environments", In Proceedings of IEEE Virtual Reality, Mar. 23, 2015, pp. 19-26.

U.S. Appl. No. 14/603,213, Chu, et al., "Upredictive Server-Side Rendering of Scenes", filed Jan. 22, 2015.

Lee, et al., "Outatime: Using Speculation to Enable Low-Latency Continuous Interaction for Mobile Cloud Gaming", In Proceedings of the 13th International Conference on Mobile Systems, Applications, and Services, May 18, 2015, 15 pages.

Chen, et al., "View Interpolation for Image Synthesis", In Proceedings of the 20th annual conference on Computer graphics and interactive techniques, Sep. 9, 1993, pp. 279-288.

Mark, et al., "Post-Rendering 3D Warping", In Proceedings of the symposium on Interactive 3D graphics, Apr. 27, 1997, pp. 7-16.

Debevec, et al., "Modeling and Rendering Architecture from Photographs: A Hybrid Geometry- and Image-Based Approach", In Proceedings of the 23rd annual conference on Computer graphics and interactive techniques, Aug. 4, 1996, pp. 11-20.

Buehler, et al., "Unstructured Lumigraph Rendering", In Proceedings of the 28th annual conference on Computer graphics and interactive techniques, Aug. 12, 2001, pp. 425-432.

Shade, et al., "Layered Depth Images", In Proceedings of the 25th annual conference on Computer graphics and interactive techniques, Jul. 19, 1998, pp. 231-242.

"Amazon AppStream", Retrieved on: Sep. 11, 2014 Available at: http://aws.amazon.com/appstream/.

"Nvidia Grid™ Cloud Gaming Beta", Retrieved on: Sep. 11, 2014 Available at: http://shield.nvidia.com/grid.

"PlayStation™ Now PS4™ Open Beta Now Live!", Retrieved on: Sep. 11, 2014 Available at: http://us.playstation.com/playstation-now.

"Sponging is no Longer a Myth", Published on: Apr. 2, 2013 Available at: http://youtu.be/Bt433RepDwM.

Allman, Mark, "Comments on Bufferbloat", In Proceedings of ACM SIGCOMM Computer Communication Review, vol. 43, Issue 1, Jan. 2013, 7 pages.

Beigbeder, et al., "The Effects of Loss and Latency on user Performance in Unreal Tournament", In Proceedings of 3rd ACM SIGCOMM Workshop on Network and System Support for Games, Aug. 30, 2004, 8 pages.

Bharambe, et al., "Donnybrook: Enabling Large-Scale, High-Speed, Peer-to-Peer Games", In Proceedings of the ACM SIGCOMM Conference on Data Communication, Aug. 17, 2008, 12 pages.

Bharambe, et al., "Colyseus: A Distributed Architecture for Online Multiplayer Games", In Proceedings of the 3rd Conference on Networked Systems Design & Implementation, vol. 3, May 8, 2006, 14 pages.

Chen, et al., "How Sensitive are Online Gamers to Network Quality?", In Communications of the ACM, vol. 49, Issue 11, Nov. 2006, 5 pages.

Dick, et al., "Analysis of Factors Affecting Players' Performance and Perception in Multiplayer Games", In Proceedings of 4th ACM SIGCOMM Workshop on Network and System Support for Games, Oct. 10, 2005, 7 pages.

Douceur, et al., "Leveraging Legacy Code to Deploy Desktop Applications on the Web", In Proceedings of the 8th USENIX Conference on Operating Systems Design and Implementation, Dec. 8, 2008, 16 pages.

"Unreal Networking Architecture", Retrieved on: Sep. 11, 2014 Available at: http://udn.epicgames.com/Three/NetworkingOverview.html.

Fernando, Randima, "GPU Gems: Programming Techniques, Tips and Tricks for Real-Time Graphics", In Addison-Wesley Professional, Apr. 1, 2004, 5 pages.

Huang, et al., "A Close Examination of Performance and Power Characteristics of 4G LTE Networks", In Proceedings of the 10th International Conference on Mobile Systems, Applications, and Services, Jun. 25, 2012, 14 pages.

Huang, et al., "An In-Depth Study of LTE: Effect of Network Protocol and Application Behavior on Performance", In Proceedings of the ACM SIGCOMM Conference on SIGCOMM, Aug. 12, 2013, 12 pages.

"Intel® Quick Sync Video", Retrieved on: Sep. 11, 2014 Available at: http://www.intel.com/content/www/us/en/architecture-and-technology/quick-sync-video/quick-sync-video-general.html.

Jefferson, et al., "Time Warp Operating System", In Proceedings of the Eleventh ACM Symposium on Operating Systems Principles, Nov. 1, 1987, 17 pages.

Kalman, R. E., "A New Approach to Linear Filtering and Prediction Problems", In Transactions of the ASME—Journal of Basic Engineering, Mar. 1960, 12 pages.

Lange, et al., "Experiences with Client-based Speculative Remote Display", In Proceedings of USENIX Annual Technical Conference, Jun. 22, 2008, 14 pages.

Mickens, et al., "Crom: Faster Web Browsing using Speculative Execution", In Proceedings of the 7th USENIX conference on Networked Systems Design and Implementation, Apr. 28, 2010, 16 pages.

Nightingale, et al., "Speculative Execution in a Distributed File System", In Proceedings of the ACM Transactions on Computer Systems, vol. 24, No. 4, Nov. 2006, 32 pages.

"NVIDIA Video Codec SDK", Retrieved on: Sep. 11, 2014 Available at: https://developer.nvidia.com/nvidia-video-codec-sdk.

Kan, Michael, "PopCap Games CEO: Android Still Too Fragmented, China Helping Company Innovate", Published on: May 10, 2012 Available at: http://bit.ly/1hQv8Mn.

Quax, et al., "Objective and Subjective Evaluation of the Influence of Small Amounts of Delay and Jitter on a Recent First Person Shooter Game", In Proceedings of the ACM SIGCOMM Conference on Applications, Technologies, Architectures, and Protocols for Computer Communication, Aug. 30, 2004, 5 pages.

Sjoberg, et al., "Nonlinear Black-Box Modeling in System Identification: A Unified Overview", In Proceedings of Automatica, vol. 31, Issue 12, Jun. 21, 1995, 55 pages.

Sommers, et al., "Cell vs. WiFi: On the Performance of Metro Area Mobile Connections", In Proceedings of the ACM conference on Internet Measurement Conference, Nov. 14, 2012, 14 pages.

(56) References Cited

OTHER PUBLICATIONS

Sundaresan, et al., "Broadband Internet Performance: A View from the Gateway", In Proceedings of the ACM SIGCOMM Conference, Aug. 15, 2011, 12 pages.
Szeliski, Richard, "Computer Vision: Algorithms and Applications", In Proceedings of Springer, Retrieved on: Sep. 11, 2014, 833 pages.
Khaw, Cassandra, "Game Developers still not sold on Android", Published on: Apr. 2, 2013 Available at: http://www.techhive.com/article/2032740/game-developers-still-not-sold-on-android.html.
Wang, et al., "Addressing Response Time and Video Quality in Remote Server based Internet Mobile Gaming", In Proceedings of Wireless Communications and Networking Conference, Apr. 18, 2010, 6 pages.
Wester, et al., "Operating System Support for Application-Specific Speculation", In Proceedings of the Sixth conference on Computer Systems, Apr. 10, 2011, 14 pages.
Winstein, et al., "Mosh: An Interactive Remote Shell for Mobile Clients", In Proceedings of the USENIX Conference on Annual Technical Conference, Jun. 13, 2012, 6 pages.
Tate, Ryan, "As Android Rises, App Makers Tumble Into Google's 'Matrix of Pain'", Published on: Aug. 26, 2013 Available at: http://www.wired.com/business/2013/08/android-matrix-of-pain/.
Chow, et al., "A Message Update Model for a Large-scale Multi-user Networked Virtual Environment System", In Journal of Multimedia Cyberscape, Jul. 24, 2005, 12 pages.
Chow, et al., "The ARP Virtual Reality System in Addressing Security Threats and Disaster Scenarios", In TENCON IEEE Region 10, Nov. 21, 2005, 7 pages.
Welch, et al., "Motion Tracking: No Silver Bullet, but a Respectable Arsenal", In Journal of IEEE Computer Graphics and Applications, vol. 22, Issue 6 , Nov. 2002, 15 pages.
Shum, et al., "Rendering with Concentric Mosaics" Proceedings of SIGGRAPH 99, in Computer Graphics Proceedings, Annual Conference Series, 299-306, Aug. 1999.
Horvitz, et al., "Perception, Attention, and Resources: A Decision-Theoretic Approach to Graphics Rendering" Published in the Proceedings of the Thirteenth Conference on Uncertainty in Articial Intelligence (UAI '97), Providence, RI, Aug. 1-3, 1997, pp. 238-249.

\* cited by examiner

VIEW RENDERING FROM MULTIPLE SERVER-SIDE RENDERINGS

BACKGROUND

A client computing device may offload image rendering operations to a server computing device. In particular, the server computing device may render images and send the rendered images to the client computing device via a wide area network. For example, a client computing device may offload rendering operations to a server computing device, because the client computing device may have hardware limitations that restrict the image rendering capabilities of the client computing device.

SUMMARY

Systems and methods for view rendering from multiple server-side renderings are disclosed. According to one aspect, a first user input is received when a client program executed by the client computing device is in a first state. The first user input is sent to a server computing device to render a view of a virtual scene. A server-rendered current view of the virtual scene that is based on the first input is received from the server computing device. A server-rendered predicted view of the virtual scene that is based on the first input is received from the server computing device. A simplified model of geometry of the virtual scene is received from the server computing device. One or more prior-rendered views of the virtual scene are retrieved from memory of the client computing device. A state change from the first state in the client program due to a second user input or a program event is identified. One or more gaps in the server-rendered current view due to the state change are determined. A rendering of the one or more gaps is selected from among the server-rendered current view, the server-rendered predicted view, and the one or more prior-rendered views. A current view is rendered from the simplified model by rendering the one or more gaps from the selected rendering. The current view is visually presented via a display of the client computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
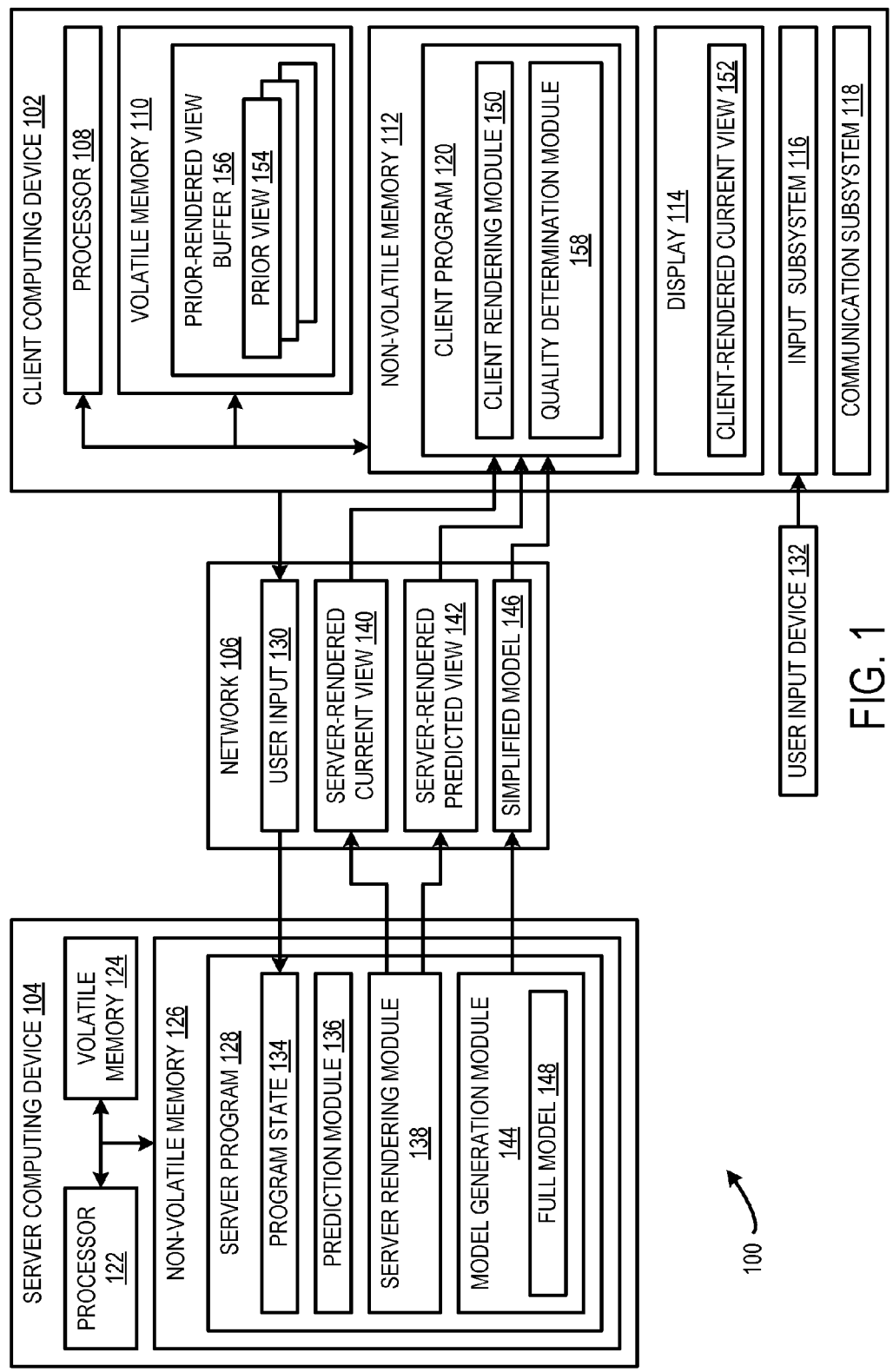
FIG. 1 shows an example computing system including a server computing device in communication with a client computing device.

As discussed above, dedicated server computing devices render and stream content (e.g., rendered images) over a wide area network to various client computing devices in what may be referred to as a "cloud-based streaming platform" for server-side rendered content Such cloud-based streaming platforms allow service providers to centralize rendering operations of graphical virtual scenes (e.g., video games, virtual reality, augmented reality) at server computing devices of a service provider. Server-side rendering offers several advantages. For example, high quality images rendered by powerful server GPUs may be streamed to client computing devices. Such, images may be of a higher quality (e.g., resolution) than images rendered by the less powerful processors of client computing devices. In another example, centralization of image rendering to the server computing devices increases debugging efficiency, software updates, hardware updates, and content additions.

One issue of a cloud-based streaming platform is that wide-area networks can be subject to periods of high latency due to network congestion, packet loss, etc., and/or continually high latency caused by a large distance between a client computing device and a server computing device. Such periods of high latency may cause pauses and delays of streaming content. In one approach to compensate for periods of high latency, the client computing device may perform a post-render image warping operation in which a server-rendered view of a virtual scene is modified to account for intermediate changes in perspective (e.g., translation and/or rotation) that occur between a time at which the server-rendered view of a virtual scene was rendered at the server computing device and a time at which a rendered view of the virtual scene is visually presented at the client computing device. For example, post-render image warping operations may use depth information (e.g., included in the server-rendered view) to perform three dimensional warping to account for the change in perspective.

However, post-render image warping operations that merely use depth information do have some drawbacks. For example, such post-render image warping operations may reveal pixels in the client-rendered view that were occluded in the server-rendered view on which the post-render image warping operations were performed. Because the newly revealed pixels were occluded in the server-rendered view, there is no depth information for the newly revealed pixels. As such, the newly revealed pixels cannot be suitably warped. Instead, gaps corresponding to the newly revealed pixels are created in the client-rendered view. In one approach, gaps are filled in the client-rendered view by an in-painting process that approximates the values of the pixels in the gaps. However, such an in-painting process results in undesirable visual artifacts that lower the quality of the rendered image that is visually presented by the client computing device. In another example, the depth information of a single server-rendered reference image that is used for post-render image warping does not account for whether neighboring pixels are connected. As such, if two neighboring pixels have different depths, the above described post-render image warping operations cannot determine whether the neighboring pixels are connected via the same surface or whether the neighboring pixels are part of separate adjacent surfaces.

The present description relates to an approach for rendering an image using post-render image warping operations that are informed by multiple different server-rendered views of a virtual scene. More particularly, the present description relates to an approach for rendering gaps formed as a result of performing post-render image warping operations on a server-rendered view. The gaps may be rendered using pixel information gleaned from different server-rendered views in which the gaps are visible. In particular, the different server-rendered views may have different perspectives of the virtual scene from which pixels corresponding to the gaps are visible. In other words, the different server-rendered views may include information about the gaps that are not included in the server-rendered view used as a reference for the post-render image warping operations.

Such an approach may leverage the greater processing power of a server computing device to render a high-quality image. Further such an approach, may compensate for latency between the server computing device and the client computing device by post-render warping the server-rendered image at the client computing device. Further still, such an approach may accurately render gaps formed as a result of the post-render image warping operations, such that undesirable visual artifacts are reduced or eliminated from the client-rendered view of the virtual scene.

FIG. 1 shows an example computing system 100 including a client device 102 configured to communicate with a server computing device 104 over a network 106. The network 106 may be a wide area network such as the Internet, or another suitable computer network. The client computing device 102 may be any suitable type of computing device. Non-limiting examples include, but are not limited to, a mobile computing device such as a smartphone, tablet, laptop, or head-mounted augmented reality computing device, a personal computing device, and a game console. The client computing device 102 includes a processor 108, volatile memory 110, non-volatile memory 112, a display 114, an input subsystem 116 and a communication subsystem 118. The non-volatile memory 112 holds a client program 120 executable by the processor 108 to perform a variety of client-side functions, as described below. Likewise, the server computing device 104 includes a processor 122, volatile memory 124, and non-volatile memory 126. The non-volatile memory holds a server program 128 executable by the processor 122 to perform a variety of server-side functions, as described below.

The input subsystem 116 of the client computing device 102 receives user input 130 from a user input device 132. The input subsystem 116 stores and organizes the user input 130, and forwards that user input 130 over the network 106 to the server computing device 104. The user input device 132 may be any suitable type of user input device. Non-limiting examples of the user input device 132 include, but are not limited to, a touchscreen, a keyboard, a mouse, and sensors (e.g., gyroscope, accelerometers, depth camera, and/or RGB camera).

In one particular example, the client program 120 and/or the server program 128 are configured as a video game that includes a virtual scene that occupies a two- or three-dimensional game space. In one example, the user input 130 is navigational input interpreted by the client program 120 and/or the server program 128 to navigate a playable character (or other controllable entity) through the virtual scene generated by the client program 120 and/or the server program 128. In another example, the user input 130 includes one or more impulse inputs that are non-navigational inputs. Non-limiting examples of impulse inputs include, but are not limited to interacting with an object, activating an ability, and adjusting a game state (e.g., adjusting a view, visually presenting a menu). In the context of a first-person perspective game, for example, an impulse input may cause a playable character to wield a weapon, attack with the weapon, turn invisible, light a torch, etc. These inputs do not themselves cause a change in navigation of the playable character within the virtual scene.

The server computing device 104 receives the user input 130 over the network 106. The server program 128 determines a current program state 134 of the client program 120 based on the user input 130. For example, the server program 120 may track the current program state 134 of the client program 120 and update the program state 134 based on the user input 130. In some implementations, the client computing device 102 may send the current program state 134 to the server computing device 102 along with the user input 130.

The server program 128 may include a prediction module 136 configured to calculate prediction information related to the client program 120. For example, the prediction information may include future user input (e.g., navigation input, impulse input), program events, and other state changes of the client program 120 based on the current program state 134 and the user input 130. For example, if a user input stream specifies that the user input has included a forward navigation input for the past few image frames, then the prediction module 136 may predict that the view of the virtual scene (e.g., the first-person perspective of the playable character) will progress forward in the same manner for the next few image frames in the future. Furthermore, the prediction information may be based on a position of the view/perspective in the virtual scene. For example, if the view/perspective is at the edge of a path, then the prediction module 136 may predict that the view/perspective will turn to stay within the path.

The prediction module 136 may employ any suitable prediction techniques. Non-limiting examples of prediction techniques that may be employed by the prediction module 136 include, but are not limited to, a neural network time-series prediction model, a linear and polynomial regression model, and a Markov model. The prediction information produced by the prediction module 136 may be used by a server rendering module 138 of the server program 128 to render a server-rendered predicted view 142 of the virtual scene. For example, the server-rendered predicted view 142 of the virtual scene may be used to render gaps formed in a post-render image warped view rendered by the client computing device 102.

The server rendering module 138 may be configured to render views of the virtual scene that may be used for visual presentation by the client computing device 102. In particular, the server rendering module 138 may be configured to render a server-rendered current view 140 of the virtual scene and a server-rendered predicted view 142 of the virtual scene. The server-rendered current view 140 may be rendered based on the user input 130 and the current state 134 of the client program 120. In one example, the server-rendered current view 140 provides a reference view from which a majority of a corresponding client-rendered current view 152 is rendered by the client computing device 102. The server-rendered predicted view 142 may be rendered based on prediction information provided by the prediction module 136. The server-rendered predicted view 142 represents a predicted future perspective of the virtual scene based on predicted future user input, state changes, and/or program events of the client program 120. In other words, the server-rendered current view 140 is a representation of a current state of the virtual scene and the server-rendered predicted view 142 is a representation of a future state of the virtual scene.

The server rendering module 138 renders the current view 140 and the predicted view 142 with corresponding depth information. In particular, each rendered view contains depth values representing distances in the virtual world (e.g., game space) from a point corresponding to a perspective of the view to each pixel (or group of pixels) in each rendered surface of the virtual scene. Further, each rendered view contains color data associated with each pixel (or group of pixels).

The server-rendered current view 140 and the server-rendered predicted view 142 may be sent from the server computing device 104 to the client computing device 102 in accordance with any suitable transmission rate. In one example, a new server-rendered current view 140 may be sent to the client computing device 102 every image frame time slot for visual presentation by the client computing device 102. Further, a new server-rendered predicted view 42 may sent to the client computing device 102 every fifth image frame time slot. In other words, the client computing device 102 may receive five server-rendered current views for every one server-rendered predicted view. For example, the server-rendered predicted view may be produced and sent on a limited basis in order to reduce usage of processing resources of the server computing device 104 and reduce usage of network bandwidth. In some implementations, the transmission rate of the server-rendered predicted view 142 may be different than every five image frame time slots. In some implementations, the transmission rate of the server-rendered predicted view 142 may be varied based on hardware resource availability and/or network bandwidth.

The server program 128 includes a model generation module 144 configured to generate a simplified model 146 of geometry of the virtual scene. The simplified model 146 may be used by the client computing device 102 as a proxy for a full model 148 of the virtual scene. In particular, the client computing device 102 may use the simplified model to render a current view of the virtual scene by piecing together (e.g., post-render image warping) image fragments from multiple server-rendered views of the virtual scene.

The simplified model 146 of geometry of the virtual scene may be derived from the full model 148 that defines the virtual scene. The full model 148 of geometry may be a representation of an entirety of the virtual scene. For example, if the virtual scene is a level or virtual world of a video game, then the full model 148 of geometry may include every vertex (or other geometric representation) that defines the level or virtual world of the game. The full model 148 of geometry may be maintained by the model generation module 144. In some implementations, a copy of the full model 148 also may be maintained by the client computing device 102. The model generation module 144 may be configured to select a subset of geometry of the full model 148 of geometry of the virtual scene for inclusion in the simplified model 146 based on the state of the client program 120 and the user input 130. In one example, the model generation module 144 may perform computations to determine portions of the model that could possibly be rendered in a future view within a threshold number of frames of the current view, and geometry of the identified portions may be included in the simplified model 146. In some implementations, the simplified model 144 may include geometry that is not included in the full model 148, but is derived from geometry in the full model 148. For example, the simplified model 146 may include a geometric element that is formed from collapsing multiple geometric elements of the full model 148.

The model generation module 144 may generate the simplified model 146 in any suitable manner. In some implementations, geometry of the virtual scene may be simplified or approximated in the simplified model 146. For example, various complex geometries in the virtual scene may be approximated by planes in the simplified model 146. In some implementations, the model generation module 144 may employ an edge-collapse algorithm to simplify the geometry of the virtual scene in the simplified model 146. In some implementations, the simplified model 146 may have a same volume as the full model 148, but less geometric features. The simplified model 146 may be sent from the server computing device 104 to the client computing device 102 via the network 106. For example, the simplified model 146 may be sent every image frame time slot, every fifth image frame time slot, or another interval.

The client computing device 102 includes a client rendering module 150 configured to render the client-rendered current view 152 from the simplified model 146 using image fragments and associated information from one or more of the server-rendered current view 140, the server-rendered predicted view 142, and one or more prior-rendered views 154. All of the listed views may be referred to herein as candidate views that may potentially contribute image fragments to the client-rendered current view 152. In particular, the client rendering module 150 determines texture coordinates of server-rendered view fragments from the different server-rendered views based on the perspective of the view and a projection matrix of the view. In other words, the client rendering module 150 may be configured to warp a server rendered view to texture the simplified model 146 based on a current state of the client program 120. The current state of the client program 120 may differ from a state of the client program 120 that was used to render the server-rendered views. For example, a user input or program event may occur after rendering of the server-rendered current view 140 that updates the perspective of the client-rendered current view 152 at the client computing device 102.

As discussed above, post-render image warping operations may generate gaps. As such, the client program 120 may use information selected from different server-rendered views to render the gaps in the client-rendered current view 152. In particular, the server-rendered predicted view 142 and one or more prior sever-rendered views 154 may provide different perspectives of the virtual scene relative to the server-rendered current view 140. These differing perspectives may reveal pixels that are not visible in the server-rendered current view 140 and may be used to render the gaps.

The client computing device 102 includes a prior-rendered view buffer 156 in volatile memory 110. The buffer 156 includes a plurality of prior-rendered views of the virtual scene. By maintaining the prior-rendered views in the buffer 156, the prior-rendered views may be quickly retrieved from local memory of the client computing device 102 to be used for gap filling purposes. In one example, the prior-rendered view buffer 156 is sized to store thirty prior-rendered views. The buffer 156 may be sized to store any suitable number of prior-rendered views. Depending on the processing resources of the client computing device 102 more than one prior-rendered view may be selected for use in rendering the client-rendered current view 152.

In some implementations, the client program 120 may determine which prior-rendered views are selected for storage in the buffer 156 based on a contribution of each view toward filling gaps in other client-rendered views. For example, whenever a new client-rendered view is generated, the view may be stored in the buffer 156, and the prior-rendered view that was used the least to fill gaps may be removed from the buffer 156 to make room for the new client-rendered view.

The client computing device includes a quality determination module 158 configured to, for each gap, select a candidate view as a rendering to render the gap in the client-rendered current view 152. In one example, the quality determination module 158 determines if a gap is visible in any of the candidate views by obtaining a coarse representation of depth values of the simplified model 146. For example, the quality determination module 158 may employ MIP mapping to extract a coarse level of the depth-/z-values of the texture. The quality determination module 158 projects the course depth data into the client-rendered current view 152. The quality determination module 158 checks that a depth of a rendered image fragment (e.g., one or more pixels) of a candidate view is within a designated deviation of a depth of the surface defined by the simplified model 146. Fragments that pass the depth test are determined to be visible. Fragments that do not pass the depth test are discarded as not being visible.

If the gap is visible in only one candidate view, then the quality determination module 158 selects the candidate view as the rendering of the gap in the client-rendered current view 152. If the gap is visible in more than one candidate view, then the quality determination module 158 assigns a quality score to each candidate view, and selects a candidate view having a highest quality score as the rendering of the gap in the client-rendered current view 152.

The quality score may be determined in any suitable manner. In one example, the quality score is derived from one or more of an angle of a perspective of the candidate view relative to the gap and a distance between a surface corresponding to the gap and the perspective of the candidate view. In particular, a candidate view having an angle straight-on or closer to perpendicular may be assigned a higher quality score. On the other hand, a candidate view having a shallower angle may be assigned a lower quality score. Further, a candidate view having a shorter distance may be assigned a higher quality score. On the other hand, a candidate view having a greater distance may be assigned a lower quality score.

Furthermore, if the gap is not visible in any of the candidate views, then the client rendering module 150 renders the gap using a smoothing or blurring algorithm. The client rendering module 150 may use any suitable type of smoothing or blurring algorithm to render the gap.

The display 114 may be configured to display the client-rendered current view 152 as part of execution of the client program 120. By rendering the client-rendered current view 152 in the manner described above, a thin client computing device may visually present high-quality images having little or no visual artifacts due to gaps. Moreover, the high-quality images may be visually presented with little or no lag due to high latency between the client computing device 102 and the server computing device 104.

The computing system 100 described above enables various methods for predicting and rendering content. Accordingly, some such methods are now described, by way of example, with continued reference to above configurations. Such methods, and others fully within the scope of the present disclosure, may be enabled via other configurations as well.

Figure 2:
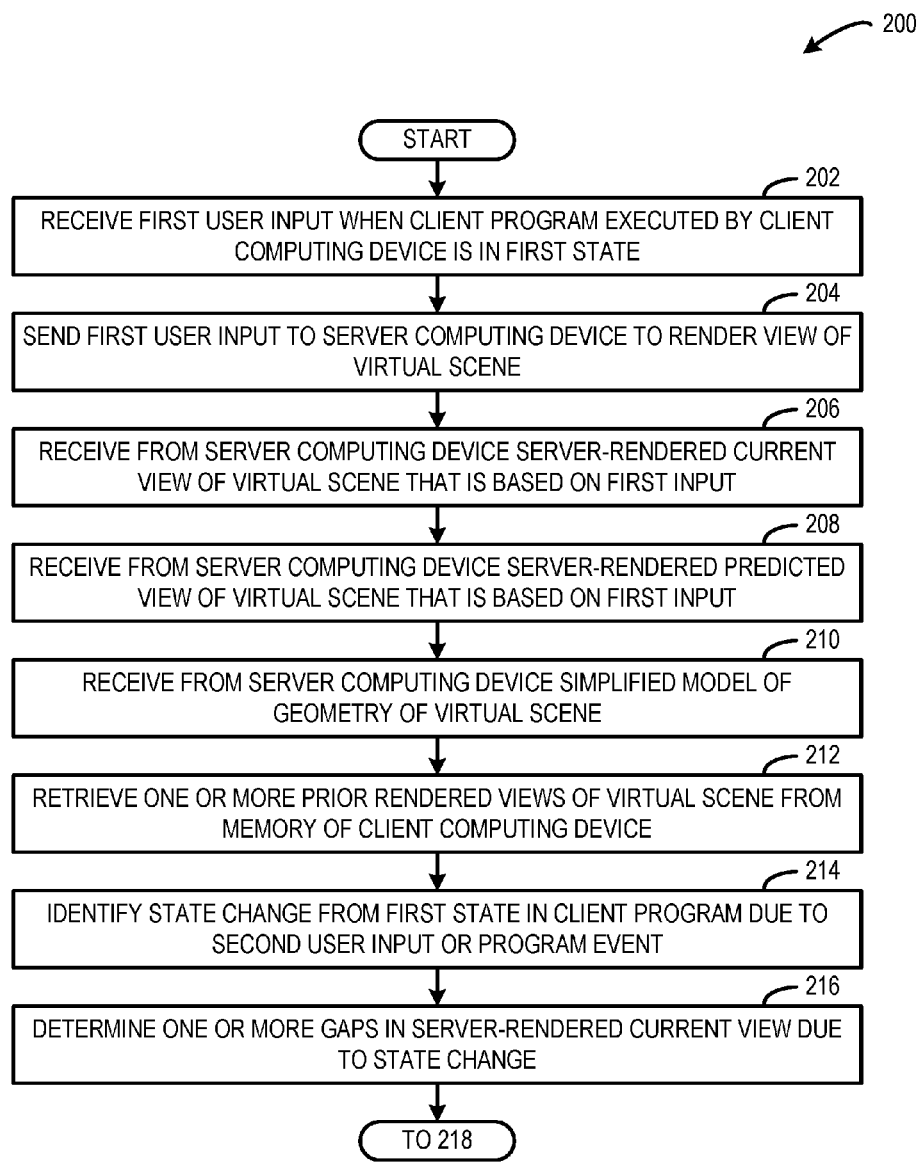
FIGS. 2 and 3 show an example method for predicting and rendering content.
Figure 3:
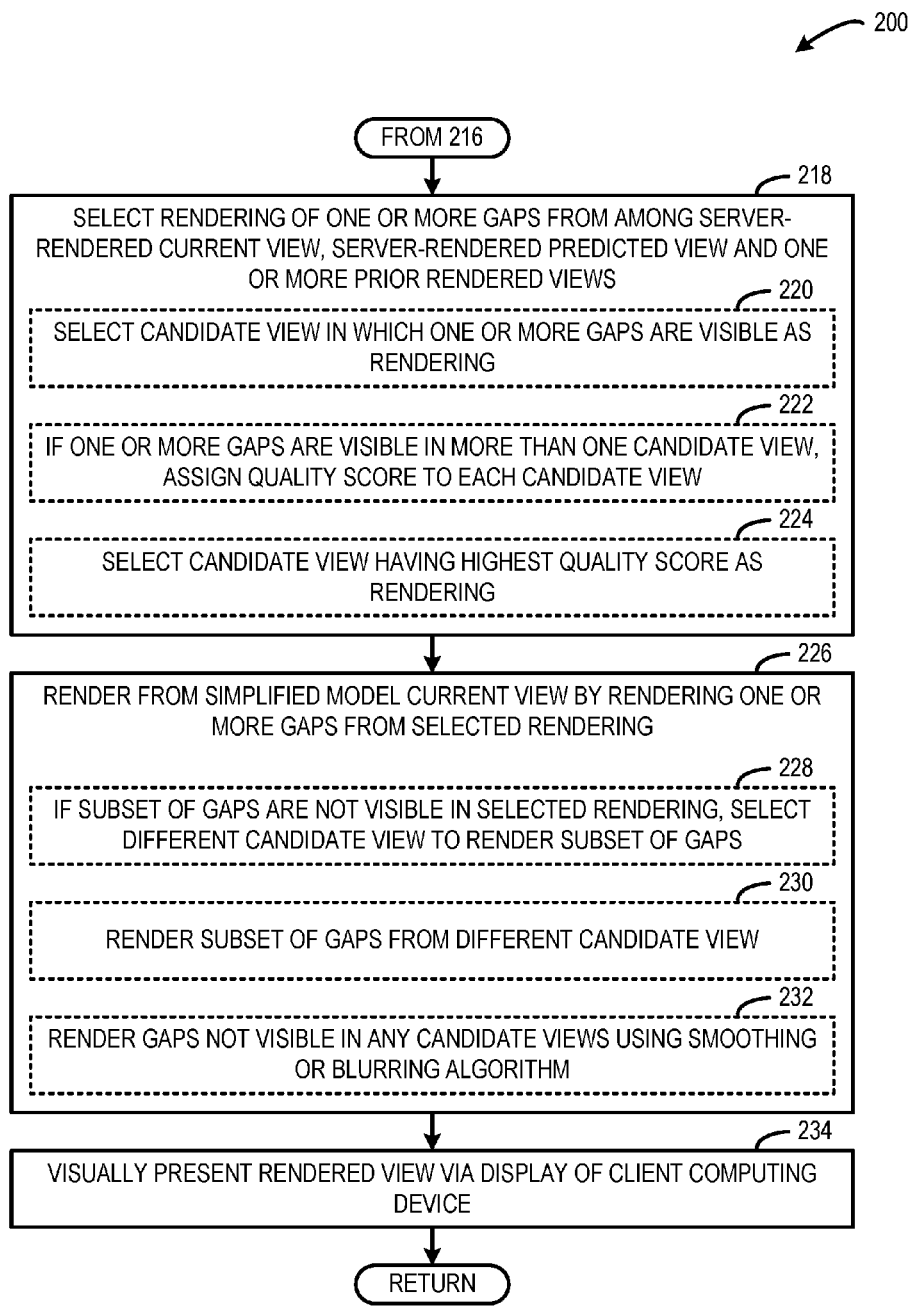

FIGS. 2 and 3 show an example method 200 for predicting and rendering content, such as a view of a virtual scene. In one example, the method 200 is performed by client program 120 of the client computing device 102 of FIG. 1. FIGS. 4-8 show various scenarios that may occur in the course of performing the method 200, and will be referenced throughout discussion of the method 200.

At 202, the method 200 includes receiving a first user input when the client program 120 executed by the client computing device 102 is in a first state. For example, the first state may include a particular perspective of a virtual scene of the client program.

At 204, the method 200 includes sending the first user input to the server computing device 104 to render a view of the virtual scene.

At 206, the method 200 includes receiving from the server computing device 104 the server-rendered current view 140 of the virtual scene that is based on the first input.

At 208, the method 200 includes receiving from the server computing device 104 the server-rendered predicted view 142 of the virtual scene that is based on the first input.

At 210, the method 200 includes receiving from the server computing device the simplified model 146 of geometry of the virtual scene.

At 212, the method 200 includes retrieving one or more prior-rendered views 154 of the virtual scene from local memory of the client computing device 102, which may be volatile memory 110 or other type of memory. In one example, the one or more prior-rendered views 154 are retrieved from the prior-rendered view buffer 156.

At 214, the method 200 includes identifying a state change from the first state in the client program 120 due to a second user input or a program event. For example, the state change may cause the perspective of the current view of the virtual scene to change from the state of the client program on which the server-rendered current view 140 was based. Such a state change causes the server-rendered current view 140 to no longer accurately represent the current view of the virtual scene. Moreover, the state change is the reason for performing post-render image warping operations at the client computing device 102 to accurately represent the current view in accordance with the state change.

Figure 4:
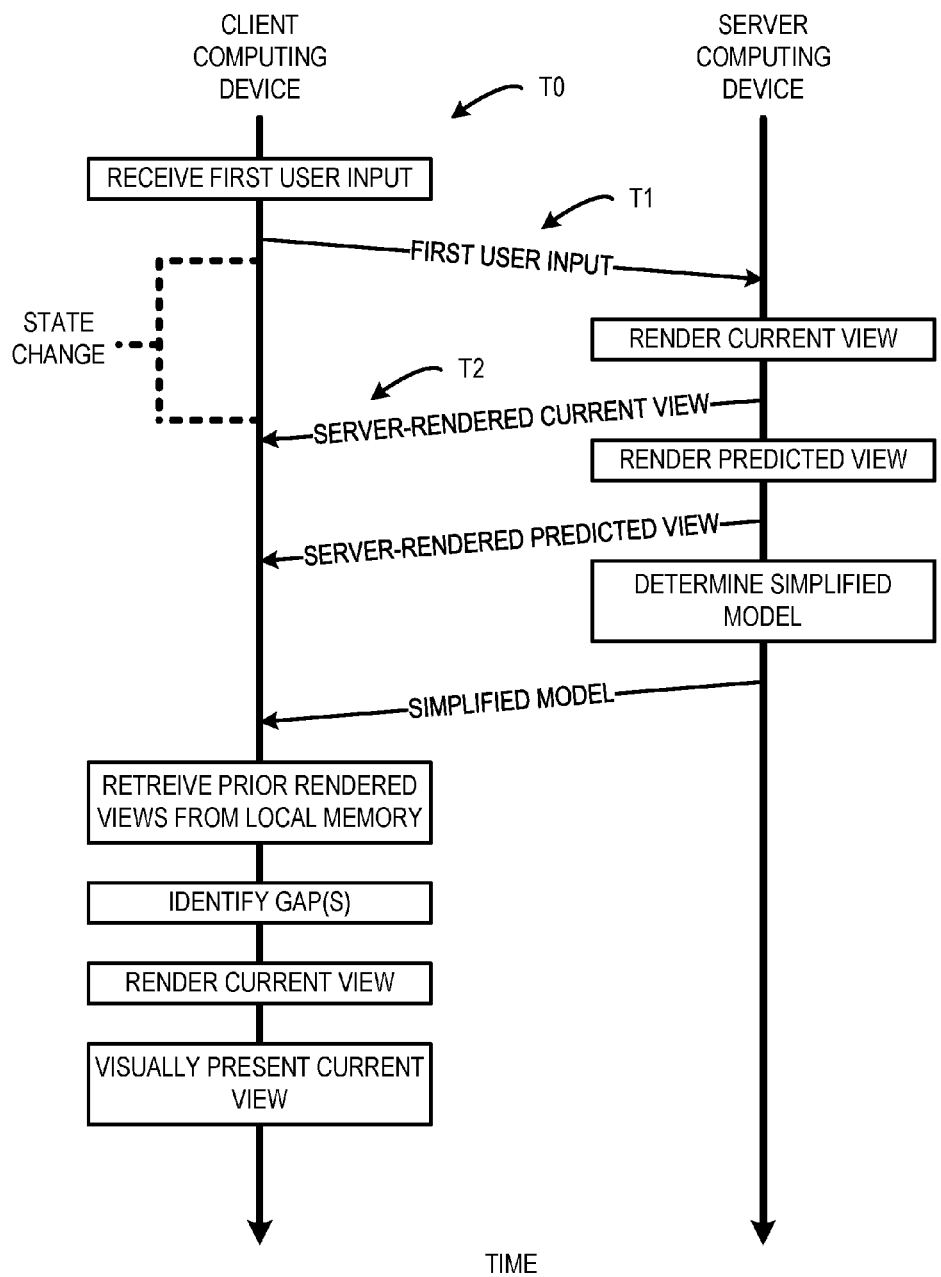
FIG. 4 shows an example timeline of events related to a client computing device visually presenting a client-rendered current view of a virtual scene.

FIG. 4 shows an example timing diagram of operations and communications performed by the client computing device 102 and the server computing device 104. At time T0, the client computing device receives the first user input and the client program is in the first state. At time T1, the client computing device 102 sends the first user input to the server computing device 104 to render the server-rendered current view 140 of the virtual scene. At time T2, the client computing device 102 receives the server-rendered current view 140 from the server computing device 104. If the state change of the client program 120 occurs at any time in between time T1 and time T2, then the client computing device 102 has to render the client-rendered current view 152 including accommodating for gaps as a result of post-render image warping. If the state change occurs prior to time T1, then the client computing device 102 merely sends the updated state information to the server computing device 104 to render the view of the virtual scene. If the state change occurs after time T2, then the client computing device 102 can merely visually present the server-rendered current view 140 because the state of the client program has not changed.

Continuing with FIG. 2, at 216, the method 200 includes determining one or more gaps in the server-rendered current view due to the state change. For example, the gaps may correspond to pixels that are not visible in the server-rendered current view 140, but which are revealed as a result of applying the projection matrix of the current view corresponding to the changed state of the client program 120.

Turning to FIG. 3, at 218, the method 200 includes selecting a rendering of the one or more gaps from among the server-rendered current view, the server-rendered predicted view and the one or more prior-rendered views. The server-rendered current view, the server-rendered predicted view and the one or more prior-rendered views may be considered candidate views from which image fragments may be selected to render the one or more gaps in the client-rendered current view 152. In one example, selection of the rendering is performed by the quality determination module 158 of the client computing device 102 of FIG. 1.

In some implementations, at 220, selecting a rendering of the one or more gaps from the candidate views optionally may include selecting a candidate view in which the one or more gaps are visible as the rendering. In one example, if a gap is visible in only one candidate view, then the candidate view is selected as the rendering.

Figure 5:
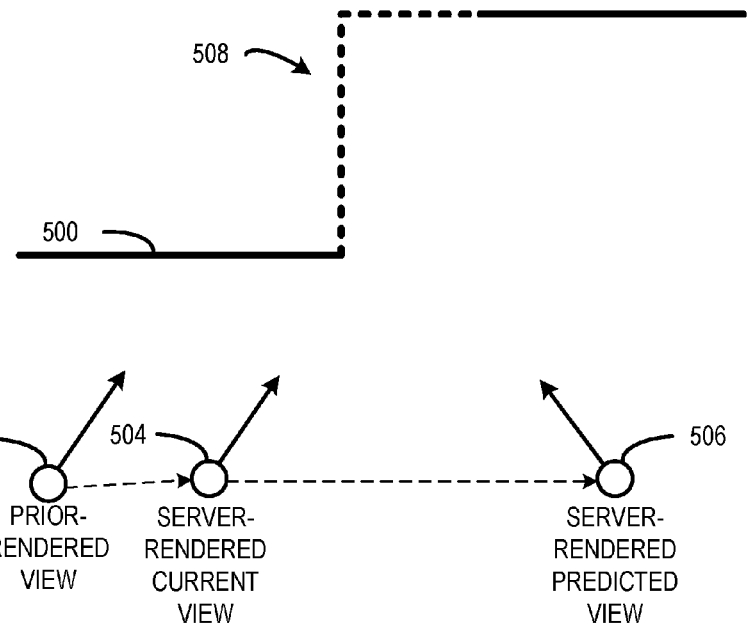
FIGS. 5-8 show example scenarios in which different candidate views are selected for rendering gaps in a client-rendered current view of a virtual scene.

FIG. 5 shows an example scenario where a gap is visible in exactly one candidate view. A simplified model 500 of geometry of the virtual scene may be viewed from a perspective of a prior-rendered view 502, a perspective of a server-rendered current view 504, and a perspective of a server-rendered predicted view 506. When the simplified model 500 is viewed from the perspective of the server-rendered current view 504, an occluded portion 508 (indicated by dotted lines) is not visible. When the server-rendered current view is transformed (e.g., post-render image warped) to the client-rendered current view to account for the state change, the occluded portion 508 becomes a gap, because the server-rendered current view does not include any information (e.g., depth, color) for those pixels. The occluded portion 508 is not visible from the perspective of the prior-rendered view 502. However, the occluded portion 508 is visible from the perspective of the server-rendered predicted view 506. As such, the server-rendered predicted view 506 may be selected to render the gap 508, because the server-rendered predicted view is the only candidate view having pixel information that can be used to render the gap.

Continuing with FIG. 3, in some implementations, at 222, selecting a rendering of the one or more gaps from the candidate views optionally may include, if the one or more gaps are visible in more than one candidate view, assigning a quality score to each candidate view. Further, at 224 selecting a rendering of the one or more gaps from the candidate view optionally may include selecting a candidate view having a highest quality score as the rendering. For example, the quality score may be derived from one or more of an angle of a perspective of the candidate view relative to the one or more gaps and a distance between a surface corresponding to the one or more gaps and the perspective of the candidate view.

Figure 6:
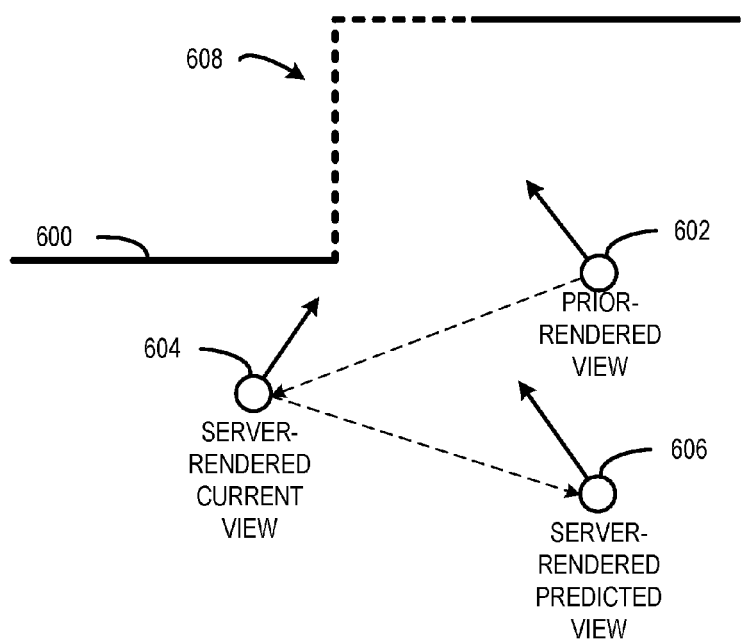

FIG. 6 shows an example scenario where a candidate view is selected to render a gap based on the candidate view being a closest view in which the gap is visible. A simplified model 600 of geometry of the virtual scene may be viewed from a perspective of a prior-rendered view 602, a perspective of a server-rendered current view 604, and a perspective of a server-rendered predicted view 606. When the simplified model 600 is viewed from the perspective of the server-rendered current view 604, an occluded portion 608 (indicated by dotted lines) is not visible. When the server-rendered current view is transformed (e.g., post-render image warped) to the client-rendered current view to account for the state change, the occluded portion 608 becomes a gap, because the server-rendered current view does not include any information (e.g., depth, color) for those pixels. In this case, the occluded portion 608 is visible from the perspective of the prior-rendered view 602 and the perspective of the server-rendered predicted view 606. Because the occluded portion 608 is visible in more than one candidate view, a quality score is assigned to each of the candidate views. In this example, a quality score of the prior-rendered view 602 is higher than a quality score of the server-rendered predicted view 606, because a distance between the perspective of the prior-rendered view 602 and the occluded portion 608 is shorter than a distance between the perspective of the server-rendered predicted view 606 and the occluded portion 608. Because the prior-rendered view 602 has the higher quality score, the prior-rendered view 602 is selected to render the gap in the client-rendered current view.

Figure 7:
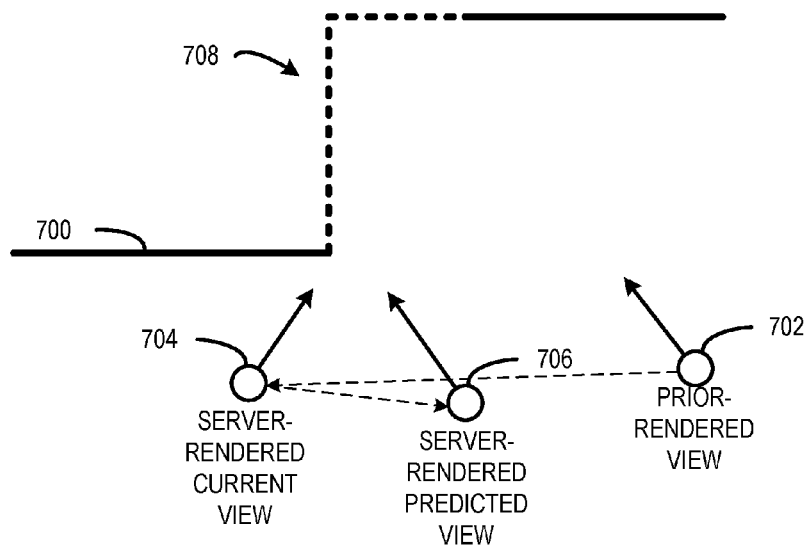

FIG. 7 shows an example scenario where a candidate view is selected to render a gap based on the candidate view having an angle that is closest to perpendicular relative to the gap. A simplified model 700 of geometry of the virtual scene may be viewed from a perspective of a prior-rendered view 602, a perspective of a server-rendered current view 704, and a perspective of a server-rendered predicted view 706. When the simplified model 700 is viewed from the perspective of the server-rendered current view 704, an occluded portion 708 (indicated by dotted lines) is not visible. When the server-rendered current view is transformed (e.g., post-render image warped) to the client-rendered current view to account for the state change, the occluded portion 708 becomes a gap, because the server-rendered current view does not include any information (e.g., depth, color) for those pixels. In this case, the occluded portion 708 is visible from the perspective of the prior-rendered view 702 and the perspective of the server-rendered predicted view 706. Because the occluded portion 708 is visible in more than one candidate view, a quality score is assigned to each of the candidate views. In this example, a quality score of the prior-rendered view 702 is higher than a quality score of the server-rendered predicted view 706, because an angle of the perspective of the prior-rendered view 702 relative to a surface of the occluded portion 708 is closer to perpendicular than an angle of the perspective of the server-rendered predicted view 606 relative to a surface of the occluded portion 708. In other words, the server-rendered predicted view 706 may be assigned a lower quality score because the server-rendered predicted view 706 has a shallow angle. Because the prior-rendered view 702 has the higher quality score, the prior-rendered view 702 is selected to render the gap in the client-rendered current view. In this example, the angle is weighted more heavily in the quality score metric than the distance. As such, although the server-rendered predicted view 706 is closer to the occluded portion 708 than the prior-rendered view 702, the shallow angle of the server-rendered predicted view 706 make the server-rendered predicted view 706 less suitable than the prior-rendered view 702 for rendering the occluded portion 708.

Returning to FIG. 3, at 226, the method 200 includes rendering from the simplified model a current view by rendering the one or more gaps from the selected rendering. In one example, rendering of the client-rendered current view is performed by the client rendering module 150 of the client computing device 102 of FIG. 1.

In some implementations, multiple gaps may be determined in the server-rendered current view, and not all of those gaps may be visible in the initially selected rendering. Accordingly, in some such implementations, at 228, rendering the current view optionally may include, if a subset of gaps are not visible in the selected rendering, select a different candidate view to render the subset of gaps. The different candidate view may be selected in the same manner as described above. In particular, if the subset of gaps are visible in only one remaining candidate view, then the candidate view is selected as the different rendering. If the subset of gaps are visible in more than one remaining candidate view, then a quality score is assigned to each remaining candidate view, and a candidate view having a highest quality score is selected to render the subset of gaps. Further, at 230, rendering the current view optionally may include rendering the subset of gaps from the different selected candidate view. In some implementations, at 232, rendering the current view optionally may include rendering gaps that are not visible in any of the candidate views using a smoothing or blurring algorithm.

Figure 8:
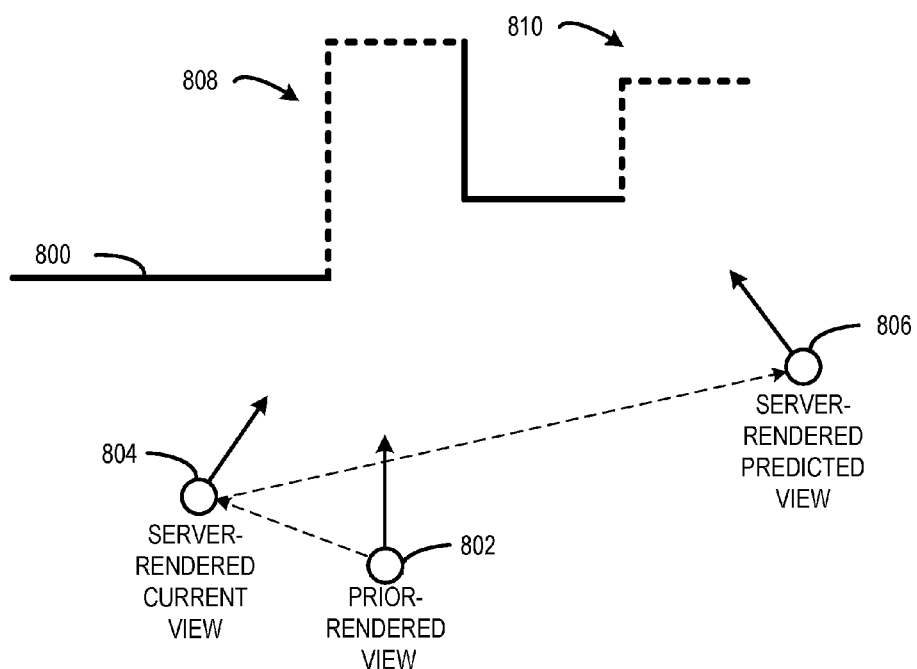

FIG. 8 shows an example scenario where multiple gaps are rendered by different candidate views. A simplified model 800 of geometry of the virtual scene may be viewed from a perspective of a prior-rendered view 802, a perspective of a server-rendered current view 804, and a perspective of a server-rendered predicted view 806. When the simplified model 800 is viewed from the perspective of the server-rendered current view 804, a first occluded portion 808 and a second occluded portion 810 (both indicated by dotted lines) are not visible. When the server-rendered current view is transformed (e.g., post-render image warped) to the client-rendered current view to account for the state change, the first occluded portion 808 and the second occluded portion become gaps, because the server-rendered current view does not include any information (e.g., depth, color) for those pixels. In this case, the first occluded portion 808 is visible from the perspective of the prior-rendered view 802. The first occluded portion 808 is not visible from the perspective of any other candidate views. As such, the prior-rendered view 802 is selected to render the first occluded portion 808. However, the second occluded portion 810 is not visible from the perspective of the prior-rendered view 802. As such, the remaining candidate views are evaluated in terms of the second occluded portion 810. In this case, the second occluded portion is visible from the perspective of the server-rendered predicted view 806. The second occluded portion 810 is not visible from the perspective of any other candidate views. As such, the server-rendered predicted view 806 is selected to render the second occluded portion 810.

Returning to FIG. 3, at 234, the method 200 includes visually presenting the rendered view via a display of the client computing device. In one example, the client-rendered current view 152 is visually presented via the display 114 of the client computing device 102 of FIG. 1.

Returning to FIG. 1, in some implementations, the server rendering module 138 may be configured to render the server-rendered predicted view 142 in a particular manner that is likely to include gaps from the server-rendered current view 140. In some implementations, a perspective of the server-rendered predicted view 140 is placed at a predicted most likely future position given previous movements. IN one example, the previous position is determined using an Extended Kalman filter that predicts a full view matrix based on a constant velocity assumption and a history of real view matrices. In other implementations, instead of using a Kalman Filter for determining the perspective of the server-rendered predicted view, a constant offset to the perspective of the server-rendered current view may be used. The constant offset may be determined by performing an offline optimization process in which a full geometry, a view matrix and an expected latency are input to the optimization process. Further, the optimization process outputs an offset matrix that gives an optimal offset between the perspective of the current view and the predicted view, while reducing gaps/disocclusions and increasing quality scores of server-rendered predicted views.

Figure 9:
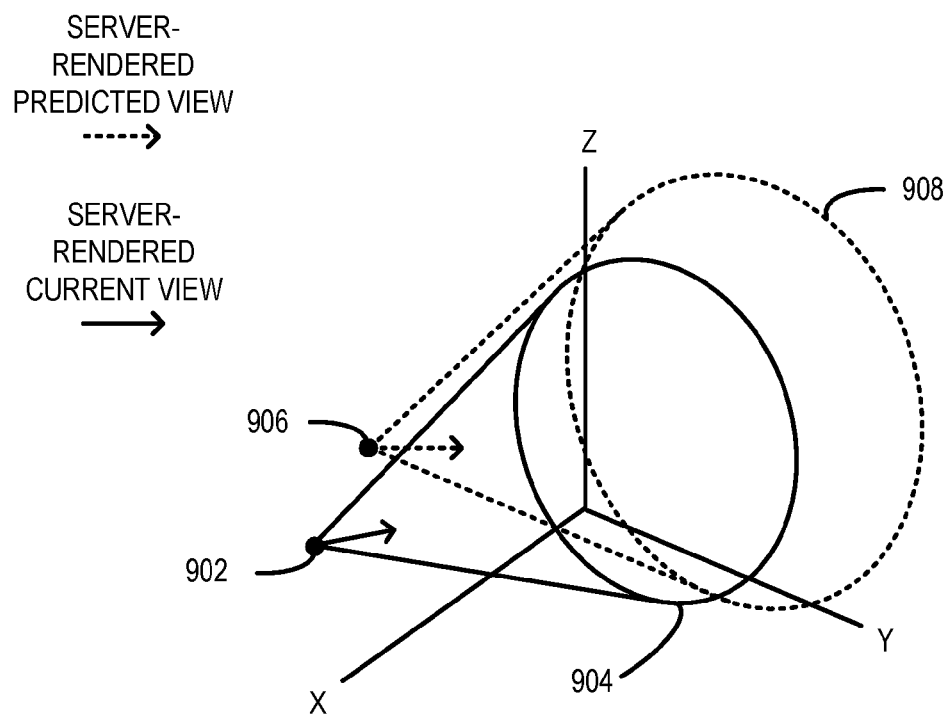
FIG. 9 shows an example server-rendered current view in relation to an example server-rendered predicted view.

FIG. 9 shows an example perspective of a server-rendered current view 902 relative to a perspective of a server-rendered predicted view 906. The perspective of the server-rendered current view 902 produces a field of view 904. The perspective of the server-rendered predicted view 906 produces a field of view 908. The field of view 908 of the server-rendered predicted view 906 is wider than the field of view 904 of the server-rendered current view 902. 906. Furthermore, the perspective of the server-rendered predicted view 906 is higher than the perspective of the server-rendered current view 902. In other words, a distance between a ground surface in the virtual scene and the perspective of the predicted view 906 is greater than a distance between the ground surface in the virtual scene and the perspective of the current view 902. The wider field of view and the higher perspective of the server rendered predicted view may increase a likelihood of gaps being visible in the sever-rendered predicted view.

The above described systems and methods offer the potential advantage of enabling a client computing device to post-render image warp high-quality server-rendered images to alleviate lag due to high latency conditions between a server computing device and the client computing device. More particularly, the resulting client-rendered images may have little or no visual artifacts due to in-painting of gaps. Accordingly, client computing device having lower processing power (e.g., mobile computing devices) may visually present high-quality rendered imagery in a timely manner.

The client computing device 102 and the server computing device 104 illustrated in FIG. 1 and described herein may take the form of one or more personal computers, server computers, tablet computers, home-entertainment computers, network computing devices, gaming devices, mobile computing devices, mobile communication devices (e.g., smart phone), and/or other computing devices.

Each such computing device includes a processor, volatile memory, and non-volatile memory, as well as a display, input device, and communication system configured to enable the computing device to communicate with other devices via a computer network.

The processor of each computing device is configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processor of each device is typically configured to execute software instructions that are stored in non-volatile memory using portions of volatile memory. Additionally or alternatively, the processor may include one or more hardware or firmware processors configured to execute hardware or firmware instructions. Processors used by the devices described herein may be single-core or multi-core, and the instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration.

Non-volatile memory is configured to hold software instructions even when power is cut to the device, and may include optical memory (e.g., CD, DVD, HD-DVD, Blu-Ray Disc, etc.), solid state memory (e.g., EPROM, EEPROM, FLASH memory, etc.), and/or magnetic memory (e.g., hard-disk drive, floppy-disk drive, tape drive, MRAM, etc.), among others. Volatile memory is configured to hold software instructions and data temporarily during execution of programs by the processor, and typically such data is lost when power is cut to the device. Examples of volatile memory that may be used include RAM, DRAM, etc.

Aspects of processor, non-volatile memory, and volatile memory may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of the client computing device 102 and the server computing device 104 implemented to perform a particular function. In some cases, a module or program may be instantiated via a processor executing instructions stored in non-volatile memory using portions of volatile memory at execution time. It will be understood that different modules and/or programs may be instantiated from the same application, service, code block, object, library, routine, API, function, etc. Likewise, the same module, program, and/or engine may be instantiated by different applications, services, code blocks, objects, routines, APIs, functions, etc. The terms "module" and "program" may encompass individual or groups of executable files, data files, libraries, drivers, scripts, database records, etc.

Each computing device may include an associated display, which may be used to present a visual representation of data computed and output by the processor. This visual representation may take the form of a graphical user interface (GUI). Such display devices may be combined with processor, volatile memory, and non-volatile memory in a shared enclosure, or such display devices may be peripheral display devices. Touch screens may be utilized that function both as a display and as an input device.

Each computing device may include a user input device such as a keyboard, mouse, touch pad, touch screen, microphone or game controller.

Each computing device may include a communication subsystem configured to communicatively couple the computing device with one or more other computing devices. The communication subsystem may include wired and/or wireless communication devices compatible with one or more different communication protocols. As non-limiting examples, the communication subsystem may be configured for communication via a wireless telephone or data network, or a wired or wireless local- or wide-area network. In some embodiments, the communication subsystem may allow the computing device to send and/or receive messages to and/or from other devices via a network such as the Internet.

Additional aspects of the present disclosure are described below. In one aspect, a client computing device comprises a processor configured to: receive a first user input when the client program is in a first state, send the first user input to a server computing device to render a view of a virtual scene, receive from the server computing device a server-rendered current view of the virtual scene that is based on the first input, receive from the server computing device a server-rendered predicted view of the virtual scene that is based on the first input, receive from the server computing device a simplified model of geometry of the virtual scene, retrieve one or more prior-rendered views of the virtual scene from memory of the client computing device, identify a state change from the first state in the client program due to a second user input or a program event, determine one or more gaps in the server-rendered current view due to the state change, select a rendering of the one or more gaps from among the server-rendered current view, the server-rendered predicted view and the one or more prior-rendered views, and render from the simplified model a current view by rendering the one or more gaps from the rendering, and a display configured to visually present the current view. In this aspect, the server-rendered predicted view and the one or more prior-rendered views may be candidate views, and selecting the rendering of the one or more gaps may include selecting a candidate view in which the one or more gaps are visible as the highest quality rendering. In this aspect, selecting the rendering of the one or more gaps may include if the one or more gaps are visible in more than one candidate view, assigning a quality score to each candidate view, and selecting a candidate view having a highest quality score as the rendering. In this aspect, the quality score may be derived from one or more of an angle of a perspective of the candidate view relative to the one or more gaps and a distance between a surface corresponding to the one or more gaps and the perspective of the candidate view. In this aspect, the one or more gaps may include a plurality of gaps, and rendering the current view may include if a subset of gaps of the plurality of gaps are not visible in the rendering, selecting a different rendering that includes the subset of gaps, and rendering the subset of gaps from the different rendering. In this aspect, rendering the current view may include rendering gaps that are not visible in any of the candidate views using a smoothing or blurring algorithm. In this aspect, the simplified model of geometry of the virtual scene may include a subset of geometry of the virtual scene that is selected for inclusion in the simplified model based the first state of the program and the first user input. In this aspect, the server-rendered current view and the server-rendered predicted view may include a plurality of pixels each having color data and depth data corresponding to a surface in the virtual scene. In this aspect, the server-rendered predicted view may have a field of view that is wider than a field of view of the server-rendered current view. In this aspect, the server-rendered predicted view may have a perspective of the virtual scene that is higher than a perspective of the server-rendered current view.

According to a second aspect, a method for predicting and rendering content, executable on a client computing device comprises receiving a first user input when a client program executed by the client computing device is in a first state, sending the first user input to a server computing device to render a view of a virtual scene, receiving from the server computing device a server-rendered current view of the virtual scene that is based on the first input, receiving from the server computing device a server-rendered predicted view of the virtual scene that is based on the first input, receiving from the server computing device a simplified model of geometry of the virtual scene, retrieving one or more prior-rendered views of the virtual scene from memory of the client computing device, identifying a state change from the first state in the client program due to a second user input or a program event, determining one or more gaps in the server-rendered current view due to the state change, selecting a rendering of the one or more gaps from among the server-rendered current view, the server-rendered predicted view and the one or more prior-rendered views, rendering from the simplified model a current view by rendering the one or more gaps from the rendering, and visually presenting the rendered view via a display of the client computing device. In this aspect, the server-rendered current view, the server-rendered predicted view and the one or more prior-rendered views may be candidate views, and selecting the rendering of the one or more gaps may include selecting a candidate view in which the one or more gaps are visible as the rendering. In this aspect, selecting the rendering of the one or more gaps may include if the one or more gaps are visible in more than one candidate view, assigning a quality score to each candidate view, and selecting a candidate view having a highest quality score as the rendering. In this aspect, the quality score may be derived from one or more of an angle of a perspective of the candidate view relative to the one or more gaps and a distance between a surface corresponding to the one or more gaps and the perspective of the candidate view. In this aspect, the one or more gaps may include a plurality of gaps, and rendering the current view may include if a subset of gaps of the plurality of gaps are not visible in the rendering, selecting a different rendering that includes the subset of gaps, and rendering the subset of gaps from the different rendering. In this aspect, rendering the current view may include rendering gaps that are not visible in any of the candidate views using a smoothing or blurring algorithm. In this aspect, the simplified model of geometry of the virtual scene may include a subset of geometry of the virtual scene that is selected for inclusion in the simplified model based on the first state of the program, and the first user input.

According to a third aspect, a client computing device comprises a processor configured to: receive a first user input when the client program is in a first state, send the first user input to a server computing device to render a view of a virtual scene, receive from the server computing device a server-rendered current view of the virtual scene that is based on the first input, receive from the server computing device a server-rendered predicted view of the virtual scene that is based on the first input, receive from the server computing device a simplified model of geometry of the virtual scene, retrieve one or more prior-rendered views of the virtual scene from memory of the client computing device, identify a state change from the first state in the client program due to a second user input or a program event, determine one or more gaps in the server-rendered current view due to the state change, identify one or more candidate views in which the one or more gaps are visible from among the server-rendered current view, the server-rendered predicted view and the one or more prior-rendered views, if only one candidate view is identified, select the candidate view as a rendering of the one or more gaps, if more than one candidate view is identified, 1) assign a quality score to each candidate view, the quality score derived from one or more of an angle of a perspective of the candidate view relative to the one or more gaps and a distance between a surface corresponding to the one or more gaps and the perspective of the candidate view, and 2) select a candidate view having a highest quality score as the rendering of the one or more gaps, and render from the simplified model a current view by rendering the one or more gaps from the rendering, and a display configured to visually present the current view. In this aspect, the one or more gaps may include a plurality of gaps, and rendering the current view may include if a subset of gaps of the plurality of gaps is not visible in the rendering, selecting a different rendering that includes the subset of gaps, rendering the subset of gaps from the different rendering, and rendering gaps that are not visible in any of the candidate views using a smoothing or blurring algorithm. In this aspect, the simplified model of geometry of the virtual scene may include a subset of geometry of the virtual scene that is selected for inclusion in the simplified model based on the first state of the program and the first user input.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A client computing device comprising:
a processor configured to:
receive a first user input when the client program is in a first state;
send the first user input to a server computing device to render a view of a virtual scene;
receive from the server computing device a server-rendered current view of the virtual scene that is based on the first input;
receive from the server computing device a server-rendered predicted view of the virtual scene that is based on the first input;
receive from the server computing device a simplified model of geometry of the virtual scene;
retrieve one or more prior-rendered views of the virtual scene from memory of the client computing device;
identify a state change from the first state in the client program due to a second user input or a program event;
determine one or more gaps in the server-rendered current view due to the state change;
select a rendering of the one or more gaps from among the server-rendered current view, the server-rendered predicted view and the one or more prior-rendered views; and
render from the simplified model a current view by rendering the one or more gaps from the rendering; and
a display configured to visually present the current view;
wherein the server-rendered current view, the server-rendered predicted view and the one or more prior-rendered views are candidate views, and
wherein selecting the rendering of the one or more gaps includes:
selecting a candidate view in which the one or more gaps are visible as the highest quality rendering; and
if the one or more gaps are visible in more than one candidate view, assigning a quality score to each candidate view, and selecting a candidate view having a highest quality score as the rendering, wherein the quality score is derived at least in part from one or more of an angle of a perspective of the candidate view relative to the one or more gaps and a distance between a surface corresponding to the one or more gaps and the perspective of the candidate view.

2. The client computing device of claim 1, wherein the one or more gaps includes a plurality of gaps, and wherein rendering the current view includes if a subset of gaps of the plurality of gaps are not visible in the rendering, selecting a different rendering that includes the subset of gaps, and rendering the subset of gaps from the different rendering.

3. The client computing device of claim 2, wherein rendering the current view includes rendering gaps that are not visible in any of the candidate views using a smoothing or blurring algorithm.

4. The client computing device of claim 1, wherein the simplified model of geometry of the virtual scene includes a subset of geometry of the virtual scene that is selected for inclusion in the simplified model based the first state of the program and the first user input.

5. The client computing device of claim 1, wherein the server-rendered current view and the server-rendered predicted view include a plurality of pixels each having color data and depth data corresponding to a surface in the virtual scene.

6. The client computing device of claim 1, wherein the server-rendered predicted view has a field of view that is wider than a field of view of the server-rendered current view.

7. The client computing device of claim 1, wherein the server-rendered predicted view has a perspective of the virtual scene that is higher than a perspective of the server-rendered current view.

8. A method for predicting and rendering content, executable on a client computing device, the method comprising:
receiving a first user input when a client program executed by the client computing device is in a first state;
sending the first user input to a server computing device to render a view of a virtual scene;
receiving from the server computing device a server-rendered current view of the virtual scene that is based on the first input;
receiving from the server computing device a server-rendered predicted view of the virtual scene that is based on the first input;
receiving from the server computing device a simplified model of geometry of the virtual scene;
retrieving one or more prior-rendered views of the virtual scene from memory of the client computing device;
identifying a state change from the first state in the client program due to a second user input or a program event;
determining one or more gaps in the server-rendered current view due to the state change;
selecting a rendering of the one or more gaps from among the server-rendered current view, the server-rendered predicted view and the one or more prior-rendered views;
rendering from the simplified model a current view by rendering the one or more gaps from the rendering; and
visually presenting the rendered view via a display of the client computing device;
wherein the server-rendered current view, the server-rendered predicted view and the one or more prior-rendered views are candidate views, and
wherein selecting the rendering of the one or more gaps includes:
selecting a candidate view in which the one or more gaps are visible as the highest quality rendering; and
if the one or more gaps are visible in more than one candidate view, assigning a quality score to each candidate view, and selecting a candidate view having a highest quality score as the rendering, wherein the quality score is derived at least in part from one or more of an angle of a perspective of the candidate view relative to the one or more gaps and a distance between a surface corresponding to the one or more gaps and the perspective of the candidate view.

9. The method of claim 8, wherein the one or more gaps includes a plurality of gaps, and wherein rendering the current view includes if a subset of gaps of the plurality of gaps are not visible in the rendering, selecting a different rendering that includes the subset of gaps, and rendering the subset of gaps from the different rendering.

10. The method of claim 9, wherein rendering the current view includes rendering gaps that are not visible in any of the candidate views using a smoothing or blurring algorithm.

11. The method of claim 8, wherein the simplified model of geometry of the virtual scene includes a subset of geometry of the virtual scene that is selected for inclusion in the simplified model based on the first state of the program, and the first user input.

12. A client computing device comprising:
a processor configured to:
receive a first user input when the client program is in a first state;
send the first user input to a server computing device to render a view of a virtual scene;
receive from the server computing device a server-rendered current view of the virtual scene that is based on the first input;
receive from the server computing device a server-rendered predicted view of the virtual scene that is based on the first input;
receive from the server computing device a simplified model of geometry of the virtual scene;
retrieve one or more prior-rendered views of the virtual scene from memory of the client computing device;
identify a state change from the first state in the client program due to a second user input or a program event;
determine one or more gaps in the server-rendered current view due to the state change;
identify one or more candidate views in which the one or more gaps are visible from among the server-rendered current view, the server-rendered predicted view and the one or more prior-rendered views;
if only one candidate view is identified, select the candidate view as a rendering of the one or more gaps;
if more than one candidate view is identified, 1) assign a quality score to each candidate view, the quality score derived from one or more of an angle of a perspective of the candidate view relative to the one or more gaps and a distance between a surface corresponding to the one or more gaps and the perspective of the candidate view, and 2) select a candidate view having a highest quality score as the rendering of the one or more gaps; and
render from the simplified model a current view by rendering the one or more gaps from the rendering; and
a display configured to visually present the current view.

13. The client computing device of claim 12, wherein the one or more gaps includes a plurality of gaps, and wherein rendering the current view includes if a subset of gaps of the plurality of gaps is not visible in the rendering, selecting a different rendering that includes the subset of gaps, rendering the subset of gaps from the different rendering, and rendering gaps that are not visible in any of the candidate views using a smoothing or blurring algorithm.

14. The client computing device of claim 12, wherein the simplified model of geometry of the virtual scene includes a subset of geometry of the virtual scene that is selected for inclusion in the simplified model based on the first state of the program and the first user input.

\* \* \* \* \*